(12) United States Patent
Hoshi (10) Patent No.: US 9,067,344 B2
(45) Date of Patent: Jun. 30, 2015

(54) MOLD AND METHOD FOR PRODUCING PLASTIC LENS

(75) Inventor: Yuji Hoshi, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 960 days.

(21) Appl. No.: 13/203,619

(22) PCT Filed: Feb. 26, 2010

(86) PCT No.: PCT/JP2010/053159
§ 371 (c)(1),
(2), (4) Date: Sep. 22, 2011

(87) PCT Pub. No.: WO2010/098466
PCT Pub. Date: Sep. 2, 2010

(65) Prior Publication Data
US 2012/0007261 A1      Jan. 12, 2012

(30) Foreign Application Priority Data

Feb. 27, 2009  (JP) ................................ 2009-046889

(51) Int. Cl.
*B29D 11/00* (2006.01)
*B29C 39/24* (2006.01)
(Continued)

(52) U.S. Cl.
CPC .............. *B29C 39/24* (2013.01); *B29C 39/006* (2013.01); *B29D 11/00413* (2013.01); *B29D 11/00538* (2013.01); *B29L 2011/0016* (2013.01); *B29C 33/0077* (2013.01)

(58) Field of Classification Search
CPC  B26C 39/24; B26C 39/006; B29D 11/00413; B29D 11/00538

USPC ..................... 264/1.1, 2.5; 425/175, 542, 808
IPC ................ B29D 11/00413,11/00442, 11/00528
See application file for complete search history.

(56) References Cited

U.S. PATENT DOCUMENTS

| 6,416,689 | B1 | 7/2002 | Keita et al. |
| 2008/0001319 | A1 | 1/2008 | Kadowaki |
| 2008/0029914 | A1 | 2/2008 | Hamanaka |

FOREIGN PATENT DOCUMENTS

| EP | 0 234 567 A1 | 9/1987 |
| EP | 1 243 403 A2 | 9/2002 |

(Continued)

OTHER PUBLICATIONS

International Search Report issued Mar. 23, 2010 in PCT/JP10/053159 filed Feb. 26, 2010.

(Continued)

*Primary Examiner* — Mathieu Vargot
(74) *Attorney, Agent, or Firm* — Oblon, McClelland, Maier & Neustadt, L.L.P.

(57) ABSTRACT

A mold 1 includes a mold assembly 2 and an injection aid member 3 attached to the mold assembly. The mold assembly 2 includes a first mold 21 and a second mold 22 which are opposed to each other, a tape member 23 connecting the outer peripheries of the first mold 21 and the second mold 22, and a cavity 24 to which a plastic lens material is injected, and a through hole 25 which makes a portion of the cavity 24 open. The injection aid member 3 includes a first opening 33 opposed to the through hole 25 of the mold assembly 2, a second opening 34 connected to the first opening 33, an attachment 32 provided around the first opening 33 and firmly attached to the mold assembly 2.

2 Claims, 6 Drawing Sheets

(51) Int. Cl.
*B29C 39/00* (2006.01)
*B29L 11/00* (2006.01)
*B29C 33/00* (2006.01)

(56) References Cited

FOREIGN PATENT DOCUMENTS

| EP | 1 759 824 A1 | | 3/2007 |
|---|---|---|---|
| EP | 1 872 929 A2 | | 1/2008 |
| JP | 40 5578 | | 2/1965 |
| JP | 2 169208 | | 6/1990 |
| JP | 3 26517 | | 3/1991 |
| JP | 5 64816 | | 3/1993 |
| JP | 6 155481 | | 6/1994 |
| JP | 2002 331536 | | 11/2002 |
| JP | 2006 56246 | | 3/2006 |
| JP | 2006 240042 | | 9/2006 |
| JP | 2008-62412 | * | 3/2008 |
| JP | 2008 191186 | | 8/2008 |

OTHER PUBLICATIONS

Extended European Search Report issued Aug. 13, 2014 in Patent Application No. 10746345.7.

* cited by examiner

MOLD AND METHOD FOR PRODUCING PLASTIC LENS

TECHNICAL FIELD

The present invention relates to a mold for molding a plastic lens by cast polymerization, and a method for producing a plastic lens using the mold.

BACKGROUND ART

Plastic lenses have advantages that they are lighter and are less easily broken than glass lenses. For that reason, the plastic lenses have been used as various lenses including spectacle lenses. The plastic lenses for spectacles are generally formed by cast polymerization.

The cast polymerization is a method in which a liquid curable plastic raw material is injected into a mold and is cured by heat or energy such as ultraviolet rays to thereby obtain a molded article. A mold used in the cast polymerization is formed, for example, by causing a pair of molds to face each other at a certain spaced interval, and winding an adhesive tape around the entire peripheries of these molds.

A technique for producing a plastic lens using such a mold is disclosed, for example, in Patent Document 1. Patent Document 1 describes a liquid plastic raw material injection apparatus for forming a plastic lens. The liquid plastic raw material injection apparatus disclosed in Patent Document 1 includes an injection pipe for injecting liquid plastic raw material into a mold, and a suction pipe provided next to this injection pipe.

When the liquid plastic raw material is injected into the mold, a portion of an adhesive tape bonding the pair of molds is peeled off to make an opening, and the injection pipe is inserted into the mold. Under this condition, the tip of the suction pipe is located at the same level as that of the liquid when the mold is filled with the liquid plastic raw material. When the liquid plastic raw material is injected into the mold, the liquid surface reaches the tip of the suction pipe and blocks a suction port, thereby changing a negative pressure in the suction pipe.

When the liquid plastic raw material injection apparatus detects the change of the negative pressure in the suction pipe, it stops the injection of the liquid plastic raw material. Then, the adhesive tape is applied again, and a space (cavity) in the mold is sealed.

Furthermore, Patent Document 2 discloses a technique concerning a production method of a cured plastic product. According to the production method of a cured plastic product disclosed in Patent Document 2, an injection hole is provided in an adhesive tape wound around the entire periphery of a mold, and a liquid plastic raw material is injected through the injection hole. After the liquid plastic raw material is filled in the mold, an ultraviolet curable resin is applied to the injection hole to seal a space in the mold.

PRIOR ART DOCUMENTS

Patent Document

[Patent Document 1] Japanese Patent Laid-Open Publication No. 2-169208

[Patent Document 2] Japanese Patent Laid-Open Publication No. 6-155481

DISCLOSURE OF THE INVENTION

Summary of the Invention

Problems to be Solved by the Invention

It has been difficult to precisely control the liquid level of the liquid plastic raw material with the liquid plastic raw material injection apparatus disclosed in Patent Document 1. For example, the volumetric capacity of the mold and thickness of the outer periphery wall of the mold vary depending on the shape of a plastic lens to be produced. Therefore, if the time from when the change of the negative pressure in the suction pipe is detected to when the injection of the liquid plastic raw material is stopped is always the same, the liquid plastic raw material may not be filled sufficiently, or the liquid plastic raw material may overflow from the mold.

When the liquid plastic raw material is not filled sufficiently, a bubble defect in which air in the mold penetrates into a plastic lens as bubbles during polymerization may be produced. On the other hand, when the liquid plastic raw material overflows from the mold, the liquid plastic raw material adheres to a part around an opening, and thus the defective adhesion of the adhesive tape may easily occur when the adhesive tape is wound again. If the defective adhesion occurs, air penetrates from the outside during the polymerization, which may result in the production of the bubble defect in the plastic lens.

Meanwhile, in order to precisely control the liquid level of the liquid plastic raw material, the liquid plastic raw material may be slowly injected, in other words, the flow rate of the liquid plastic raw material to be injected may be decreased. The decrease in the flow rate of the liquid plastic raw material, however, may result in the decrease in the productivity.

Furthermore, in the production method of the cured plastic product disclosed in Patent Document 2, the productivity has not easily been increased. The injection hole provided in the adhesive tape is required to be set to be larger than the nozzle, because it also serves as an exhaust port for air in the mold. The larger the cross-sectional area of the nozzle hole is, the greater the flow rate of the liquid plastic raw material can be, and the liquid plastic raw material can be filled faster. When the cross-sectional area of the nozzle hole and the injection hole are made large, however, a large period of time is required for sealing the injection hole.

In addition, according to the production method of the cured plastic product disclosed in Patent Document 2, the liquid plastic raw material may sometimes overflow from the injection hole. It may cause concern that the overflowed liquid plastic raw material may adversely affect instruments or workers involved in an injection operation or a polymerization step.

The present invention has been made in view of the above-discussed problems, and aims to eliminate the need for precisely controlling the liquid level of the liquid plastic raw material (plastic material), and improve the productivity by increasing the flow rate of the liquid plastic raw material.

Means for Solving the Problem

In order to solve the problems described above, and achieve objectives of the present invention, the mold according to the present invention includes a mold assembly and an injection aid member which is attached to the mold assembly. The mold assembly includes a first mold and a second mold which are opposed to each other, a tape member which connects the outer peripheries of the first mold and the second mold, a cavity to which a plastic lens material is injected, and a through hole which opens a portion of the cavity. The injection aid member includes a first opening which is opposed to the through hole of the mold assembly, a second opening which is connected to the first opening, and an attachment provided around the first opening and firmly attached to the mold assembly.

The method for producing a plastic lens according to the present invention includes a mold assembly step, an aid member attachment step, a through hole forming step, an injection step, a sealing step, and a polymerization step. In the mold assembly step, a first mold and a second mold are caused to face each other, and outer peripheries of the first mold and the second mold are connected by a tape member to assemble a mold assembly having a cavity. In the aid member attachment step, an attachment provided around a first opening of an injection aid member having the first opening and a second opening connected to the first opening is firmly attached to the mold assembly, and the first opening is caused to face the tape member forming an outer periphery of the cavity.

In the through hole forming step, a through hole is provided in a portion of the tape member opposed to the first opening. In the injection step, a nozzle is inserted through the second opening of the injection aid member into the cavity, and a plastic lens material is injected thereto. In the sealing step, the second opening of the injection aid member is sealed with a sealing member. In the polymerization step, the plastic lens material injected to the cavity is polymerized.

According to the present invention, the nozzle is inserted into the injection aid member, and the plastic lens material is injected into the cavity. Thus, the plastic lens material which has filled the cavity and has overflowed from the through hole can be stored in the injection aid member. Hence, the leakage of the plastic lens material to the outside can be prevented. This solves problems such as the plastic lens material adheres to instruments or workers involved in the injection step or in the polymerization step.

Furthermore, according to the present invention, the second opening of the injection aid member is sealed with the sealing member to thereby hermetically seal the cavity. This eliminates the need for precisely controlling the liquid level of the plastic lens material to be injected to the cavity. Furthermore, even if the cross-sectional area of the nozzle and the through hole are made large, the cavity can easily be hermetically sealed by sealing the injection aid member.

Effect of the Invention

According to the present invention, the precise control of the liquid level of the plastic lens material is not required, and the productivity can be improved by increasing the flow rate of the plastic lens material.

DESCRIPTION OF THE PREFERRED EMBODIMENT

Embodiments for carrying out a method for producing a plastic lens and mold according to the present invention will be explained below, referring to FIG. 1 to FIG. 7. In each drawing, the same reference numerals are used to designate identical members.

Figure 1A:
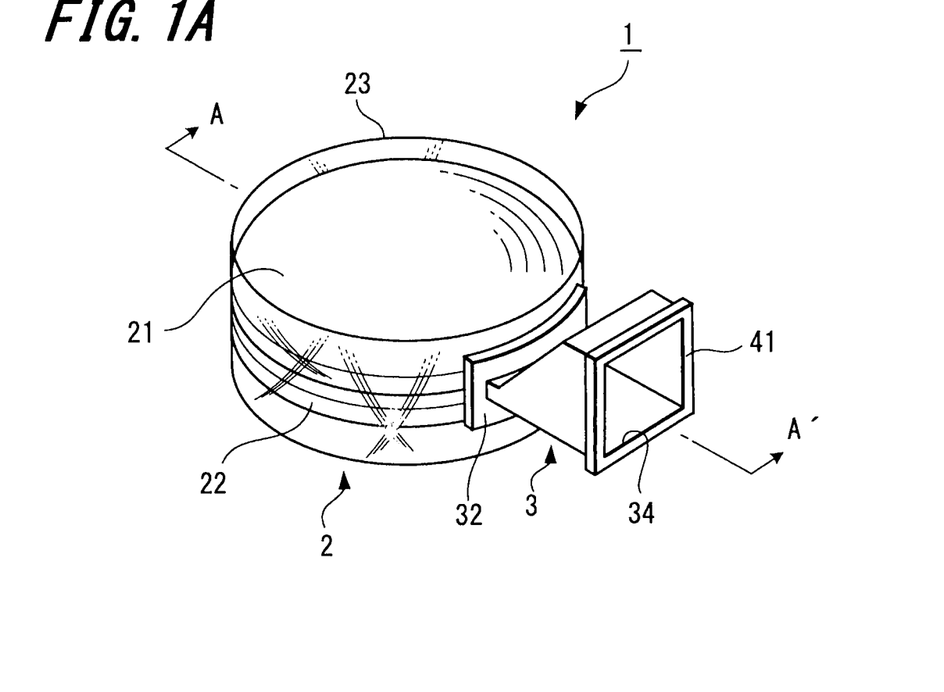
FIG. 1A is a perspective view showing a mold according to a first embodiment of the present invention.
Figure 1B:
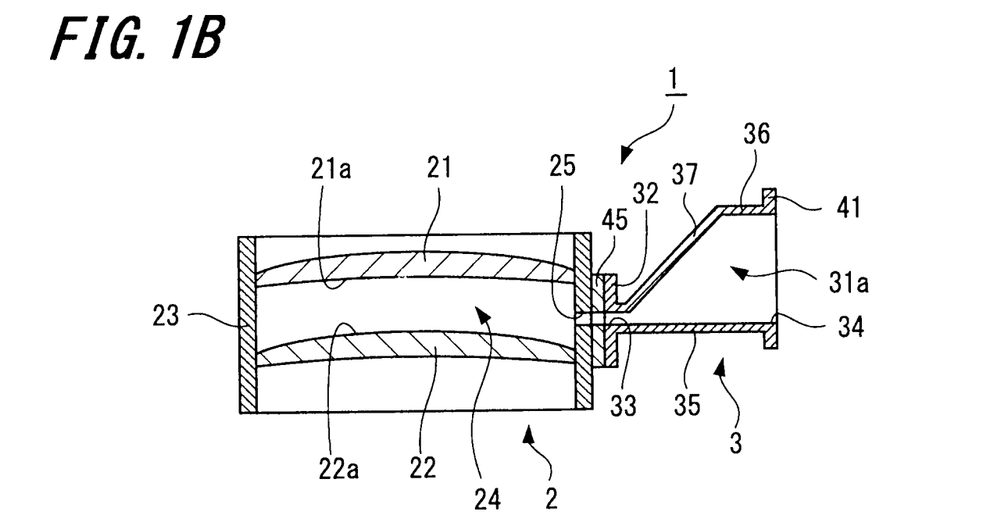
FIG. 1B is a cross-sectional view showing the mold in FIG. 1A by cutting it along with a line indicated by "A-A'".

<1. First Embodiment of Mold>
[Mold]
First, a mold according to the first embodiment of the mold of the present invention will be explained referring to FIG. 1.

FIG. 1A is a perspective view showing the mold according to the first embodiment, and FIG. 13 is a cross-sectional view showing the mold in FIG. 1A by cutting it along a line indicated by "A-AT".

A mold 1 includes a mold assembly 2, an injection aid member 3, and a sealing member 4 (see FIG. 4).
[Mold Assembly]
The mold assembly 2 includes a first mold 21 and a second mold 22 which are opposed to each other at a certain spaced interval, and a tape member 23 which connects the outer peripheries of the two molds 21 and 22.

The first mold 21 is formed so as to have a surface surrounded with a continuous curve such as a circle or ellipse, or surrounded with continuous curves and continuous straight lines, and has a concavely curved lens forming surface 21a. The second mold 22 is formed into a shape which is approximately the same as that of the first mold 21. The second mold 22 has a convexly curved lens forming surface 22a. The lens forming surface 22a of the second mold 22 is opposed to the lens forming surface 21a of the first mold 21.

The first and second molds 21 and 22 are formed by, for example, pouring molten glass into a metal mold. It should be noted that, in this embodiment, the first and second molds according to the present invention may be formed from a resin or a metal, although the first and second molds 21 and 22 are formed from glass. Furthermore, the first mold and the second mold may be formed by using a different material from each other.

The tape member 23 is a so-called adhesive tape, and is wound around the outer peripheries of the first and second molds 21 and 22 one or more times. The width of the tape member 23 is set to a width such that the tape member projects from outer peripheries of the first and second molds 21 and 22. Accordingly, the tape member 23 covers the entire outer peripheries of the first and second molds 21 and 22. It should be noted that the width of the tape member used in the present invention is sufficient, so long as a space between the first mold 21 and the second mold 22 is hermetically sealed.

The tape member 23 includes a substrate and an adhesive layer formed on one surface (an adhesive surface) of the substrate. Examples of the substrate of the tape member 23 may include polyester. On the other hand, as the adhesive layer, for example, adhesives which do not dissolve in a plastic lens material 51 (see FIG. 4) or do not inhibit polymerization are preferable, and examples thereof may include silicone adhesives, and the like.

In the mold assembly 2, a cavity 24 which is surrounded by the lens forming surfaces 21a and 22a of the first and second molds 21 and 22, and the tape member 23 is formed. The plastic lens material 51 (see FIG. 4) is injected into the cavity 24. It should be noted that the tape member 23 forming the outer periphery of the cavity 24 is provided with a through hole 25.

[Injection Aid Member]

Next, the injection aid member 3 will be explained referring to FIG. 2.

Figure 2:
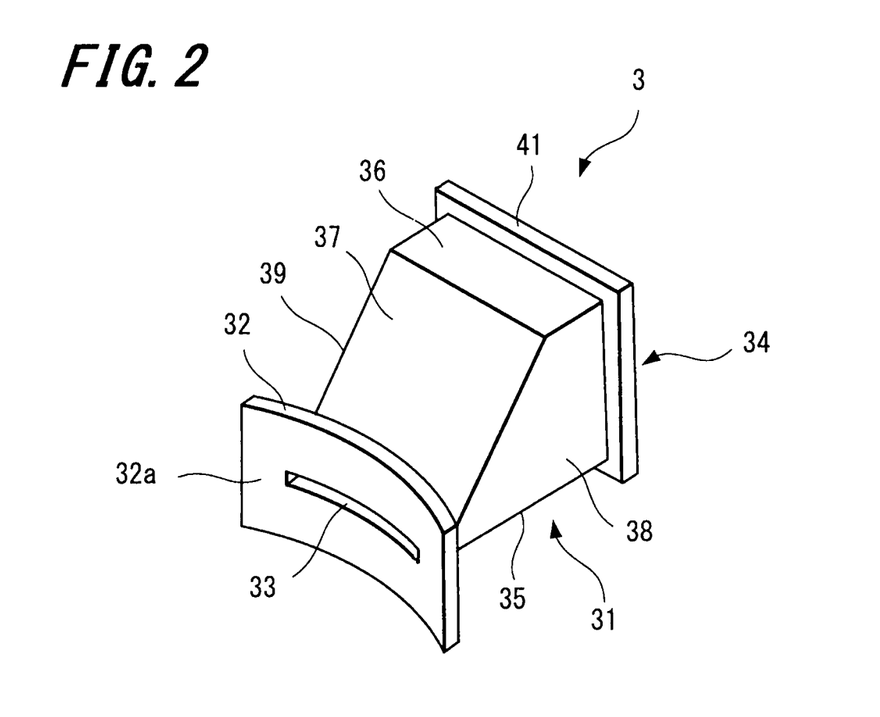
FIG. 2 is a perspective view showing an injection aid member to be used with the mold according to the first embodiment of the present invention.

FIG. 2 is a perspective view showing the injection aid member 3.

The injection aid member 3 is formed by, for example, injection-molding a thermoplastic resin that can easily be processed, such as polypropylene or polyethylene. The injection aid member 3 includes an aid member body 31 which is formed into an approximately quadrangular-tubular shape, and an attachment 32 that is continuous with one end of the aid member body 31.

The aid member body 31 includes a first opening 33 and a second opening 34 which is opposed to the first opening 33. The first opening 33 is formed into a long and narrow, approximately rectangular shape, and the second opening 34 is formed into an approximately quadrangular shape (see FIG. 2). The opening area of the first opening 33 is set to be smaller than that of the second opening 34.

The aid member body 31 includes a guide plate 35, a plane plate 36 which is opposed to the guide plate 35, a inclined plate 37 that is continuous with the plane plate 36, and two side plates 38 and 39. The guide plate 35 forms one side of the first opening 33 and one side of the second opening 34, and has a flat surface which is in parallel with a direction in which both of the openings 33 and 34 open. The flat surface of the guide plate 35 is a guide surface that guides a nozzle 101 (see FIG. 4).

The plane plate 36 forms one side of the second opening 34, and has a flat surface which is in parallel with the flat surface of the guide plate 35. The inclined plate 37 forms one side of the first opening 33, and is inclined to a direction in which the first opening 33 and the second opening 34 open. This makes an interior space 31a in the aid member body 31 narrower as the interior space 31a approaches the first opening 33 (see FIG. 2). Each of the two side plates 38 and 39 is continuous with the guide plate 35, the plane plate 36 and the inclined plate 37, and form two sides of the first opening 33 and two sides of the second opening 34.

A fixing portion 41 is provided on the periphery of the second opening 34. The fixing portion 41 is continuous with the guide plate 35, the plane plate 36 and the two side plates 38 and 39, and is formed into a quadrangular frame shape (see FIG. 1). The sealing member 4 is firmly attached and fixed to the fixing portion 41.

The attachment 32 is provided on the periphery of the first opening 33, and is formed into an approximately rectangular frame shape. The attachment 32 is curved in a circular arc shape, and has a curved surface 32a corresponding to the outer periphery surface of the mold assembly 2. That is, the radius of curvature of the curved surface 32a of the attachment 32 is set to be approximately the same as the radius of curvature of the outer periphery surface of the mold assembly 2. The injection aid member 3 is attached to the mold assembly 2 by fixing the curved surface 32a of the attachment 32 to the outer periphery surface of the mold assembly 2.

[Adhesive Member]

Next, an adhesive member 45 will be explained referring to FIG. 2.

FIG. 2 is a perspective view showing the adhesive member 45.

Figure 3:
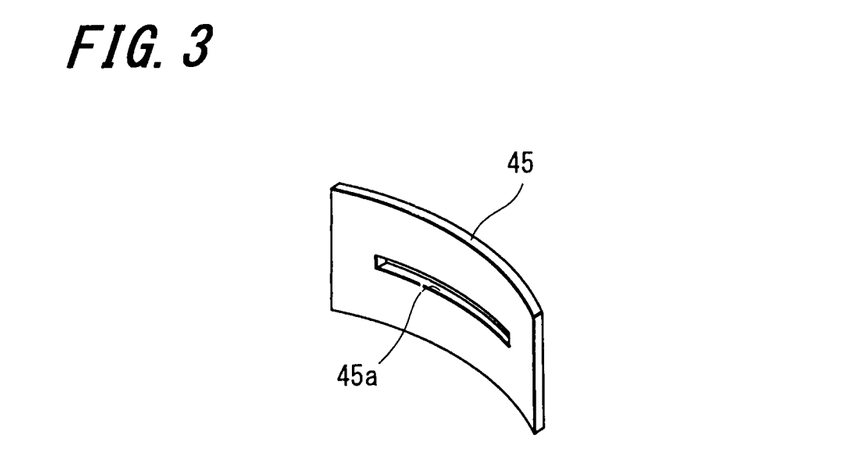
FIG. 3 is a perspective view showing an adhesive member to be used with the mold according to the first embodiment of the present invention.

The adhesive member 45 is a double-sided adhesive tape used for fixing the curved surface 32a of the attachment 32 to the outer periphery surface of the mold assembly 2. The adhesive member 45 is formed into a rectangular sheet shape having approximately the same size as that of the attachment 32, and has a through hole 45a. The through hole 45a in the adhesive member 45 is opposed to the first opening 33 of the injection aid member 3.

The adhesive member 45 has a polyethylene substrate and an adhesive layer composed of an acrylic adhesive agent. Polyesters or fabrics may be used as the substrate of the adhesive member 45. Furthermore, as the adhesive layer, adhesives which do not dissolve in the plastic lens material (see FIG. 4) or do not inhibit polymerization are preferably used, and rubber adhesives may be used in addition to the silicone adhesives.

In this embodiment, the double-sided adhesive tape has been used as the adhesive member. However, cold-setting adhesives, thermosetting adhesives, ultraviolet cure adhesive, or hot-melt adhesives may be used so long as the adhesives do not dissolve in the plastic lens material 51 (see FIG. 4) and adhesiveness is not impaired.

[Sealing Member]

Next, the sealing member 4 will be explained.

The sealing member 4 (see FIG. 4) is formed into a sheet shape having a size covering the second opening 34 of the aid member body 31 and the fixing portion 41. The sealing member 4 is firmly attached and fixed to the fixing portion 41 by using a heat-sealing method or an adhesive, and the like.

[Production Method of Plastic Lens]

Next, a method for producing a plastic lens using the mold 1 according to the present invention is explained referring to FIG. 4.

FIGS. 4A-4E are explanatory views illustrating the method for producing a plastic lens according to the present invention.

In the method for producing a plastic lens by using the mold 1, a mold assembly step, an aid member attachment step, a through hole forming step, an injection step, a sealing step, and a polymerization step are taken.

[Mold Assembly Step]

Figure 4A:
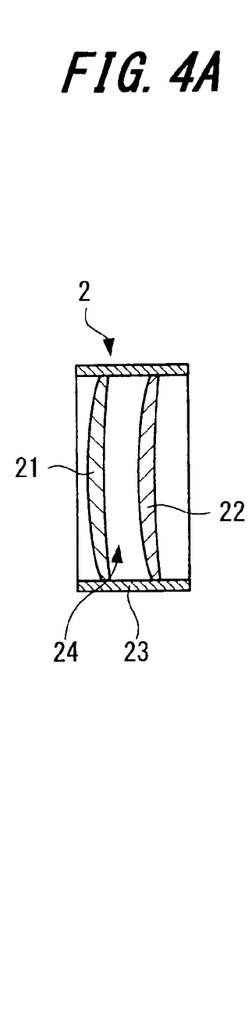
FIGS. 4A-4E are explanatory views illustrating a method for producing a plastic lens of the present invention.

First, the mold assembly step will be explained referring to FIG. 4A.

In the mold assembly step, the first mold 21 and the second mold 22 are caused to face each other at a certain spaced interval, and the outer peripheries thereof are connected by the tape member 23, whereby the mold assembly 2 is assembled. In the mold assembly 2, the cavity 24, which is hermetically sealed by the lens forming surfaces 21a and 22a of the first and second molds 21 and 22, and the tape member 23 is formed.

[Aid Member Attachment Step]

Figure 4B:
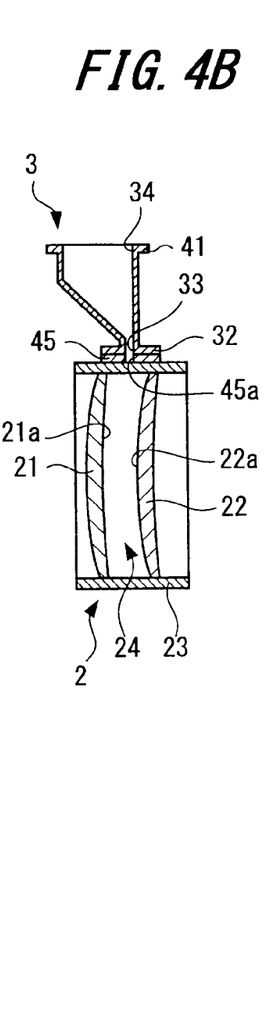

Next, the aid member attachment step will be explained referring to FIG. 4B.

In the aid member attachment step, the injection aid member 3 is attached to the mold assembly 2. That is, the curved surface 32a of the attachment 32 provided on the injection aid member 3 is firmly attached and fixed to the outer periphery surface of the mold assembly 2 through the adhesive member 45.

The curved surface 32a of the attachment 32 is set so as to have a radius of curvature corresponding to (approximately the same as) that of the outer periphery surface of the mold assembly 2. Accordingly, the curved surface 32a of the attachment 32 can be securely attached to the outer periphery surface of the mold assembly 2.

When the injection aid member 3 is attached to the mold assembly 2, the first opening 33 of the injection aid member 3 is caused to face the outer periphery of the cavity 24 formed in the mold assembly 2 through the tape member 23. Furthermore, the first opening 33 is located on the side of the lens forming surface 22a of the second mold 22. That is, when the injection aid member 3 is attached to the mold assembly 2, the first opening 33 is caused to face the outer periphery of the cavity 24, and an extended line of the first opening 33 intersects with the lens forming surface 22a of the second mold 22.
[Through Hole Forming Step]

Figure 4C:
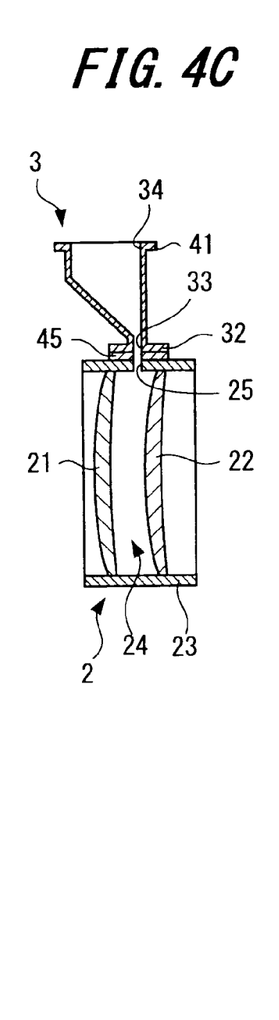

Next, the through hole forming step will be explained referring to FIG. 4C.

In the through hole forming step, the through hole 25 is provided in a portion of the tape member 23 opposed to the first opening 33, whereby the interior space 31a in the injection aid member 3 and the cavity 24 are connected to each other through the through hole 25 and the first opening 33.

In this embodiment, the through hole 25 is provided by inserting a tool from the second opening 34 of the injection aid member 3, and making a cut in the tape member 23 along the first opening 33. It should be noted that, in the through hole forming step in the present invention, the tape member 23 may be processed by a method using laser to provide the through hole 25. Furthermore, there is no restriction as to the order of the through hole forming step, and the through hole 25 may be provided after the mold assembly step has been taken, and before the injection aid member 3 is attached.
[Injection Step]

Figure 4D:
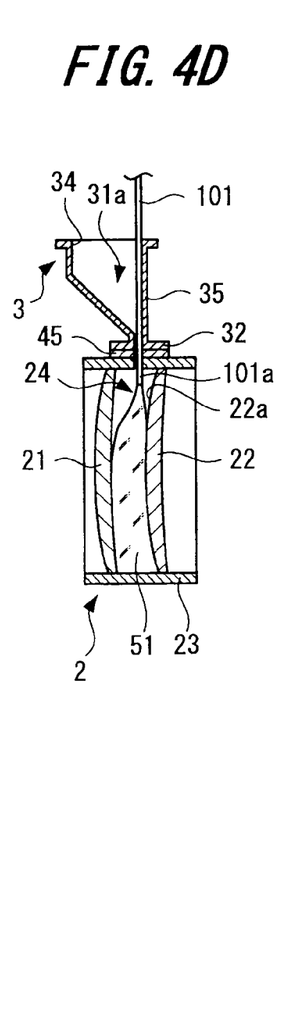

Next, the injection step will be explained referring to FIG. 4D.

In the injection step, the nozzle 101 is inserted from the second opening 34 of the injection aid member 3, and the plastic lens material 51 is injected into the cavity 24.

Here, the plastic lens material 51 will be explained. In this embodiment, a thermosetting resin composition polymerization-curable by heat is used as the plastic lens material 51. Specifically, as the plastic lens material 51, bisisocyanatomethylbicycloheptane, 1-mercapto-2,3-bis(mercaptoethylthio)propane, and pentaerythritol-tetrakismercaptopropionate are mixed, and, as a polymerization catalyst, a monomer using dibutyltindichloride is used.

A photocurable resin composition which is polymerization-curable by light such as ultraviolet rays can be used as the plastic lens material 51 in the present invention, in addition to the thermosetting resin compositions described above. The photocurable resin composition contains photocurable monomers, and a photopolymerization initiator.

The nozzle 101 which has been inserted from the second opening 34 is guided along the guide plate 35 of the injection aid member 3. The tip part 101a passes through the through hole 25, and is inserted into the cavity 24. Then, the plastic lens material 51 is discharged from the nozzle 101. The plastic lens material 51 discharged from the nozzle 101 first moves on the lens forming surface 22a of the second mold 22, and is filled in the cavity 24. As a result, a formation of bubbles in plastic lens material 51 filled in the cavity 24 can be inhibited.

When the injection of the plastic lens material 51 is continuously performed, the cavity 24 is filled with the plastic lens material 51, and the material overflows into the interior space 31a of the injection aid member 3 through the through hole 25. The injection of the plastic lens material 51 is continued until an appropriate amount of the plastic lens material 51 is stored in the interior space 31a of the injection aid member 3 (see FIG. 4E). When the injection of the plastic lens material 51 is completed, the nozzle 101 is pulled out from the injection aid member 3.
[Sealing Step]

Figure 4E:
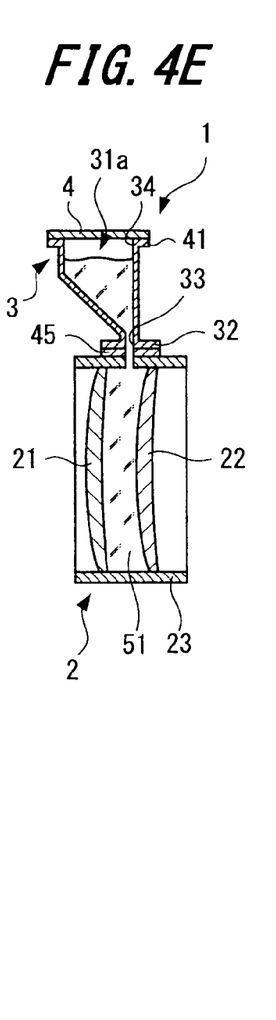

Next, the sealing step will be explained referring to FIG. 4E.

In the sealing step, the second opening 34 of the injection aid member 3 is sealed with the sealing member 4.

In this embodiment, the sealing member 4 is firmly attached and fixed to the fixing portion 41 by using a heat-sealing method, whereby the cavity 24 and the interior space 31a in the injection aid member 3 connected to the cavity 24 are hermetically sealed. In this sealing step, because the sealing member 4 is not brought into contact with the plastic lens material 51, the second opening 34 can be securely sealed without being affected by the plastic lens material 51.

As described above, the injection of the plastic lens material 51 is stopped when an appropriate amount of the plastic lens material 51 is stored in the interior space 31a of the injection aid member 3. Accordingly, the interior space 31a in the injection aid member 3 is not filled with the plastic lens material 51. Thus, the second opening 34 can easily be sealed with the sealing member 4, thereby improving the workability of the sealing operation.

Figure 5:
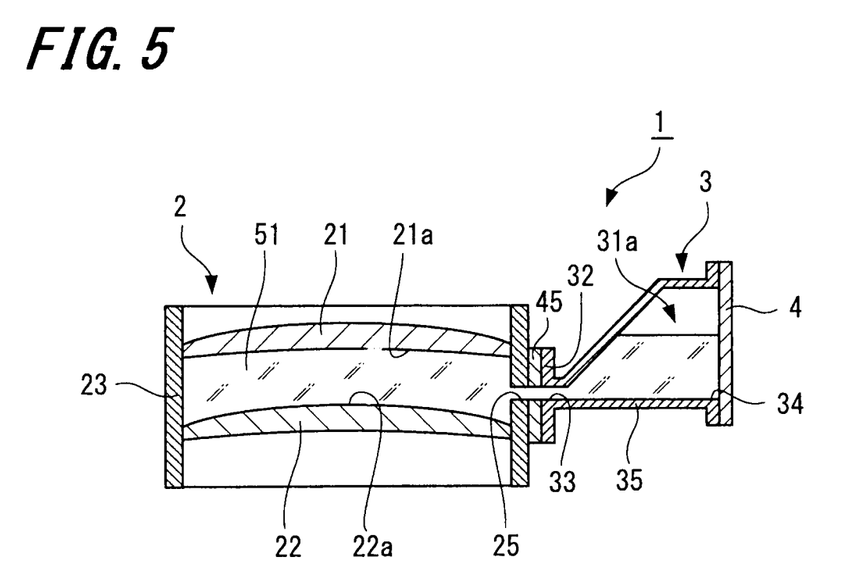
FIG. 5 is an explanatory view illustrating a state in which a plastic lens material is injected into the mold of the invention, and a through hole is horizontally directed.

FIG. 5 is an explanatory view showing the mold 1 in a state in which the sealing step has been taken.

As shown in FIG. 5, the mold 1 on which the sealing operation has been performed can be placed such that the guide plate 35 of the injection aid member 3 is directed downwardly.

Hence, if the plastic lens material 51 is injected into the interior space 31a of the injection aid member 3 to such an extent that the through hole 25 is completely filled with the material, gas (air) in the interior space 31a does not enter the cavity 24. That is, the appropriate amount of the plastic lens material 51, as described above, is an amount which is decided depending on the position of the mold in the polymerization step described below and in which the through hole 25 is completely filled with the plastic lens material 51.
[Polymerization Step]

Next, the polymerization step will be explained.

In the polymerization step, the plastic lens material 51, which has been injected in the cavity 24, is polymerized.

In this embodiment, the polymerization is performed by placing the mold 1 that has been filled with the plastic lens material 51 in a heating furnace (not shown), whereby the plastic lens material 51 is cured to thereby form a plastic lens (not shown). In this embodiment, the temperature inside the heating furnace was raised to 120° C. in about 20 hours, however the sealing property of the interior space 31a of the injection aid member 3 and the cavity 24, sealed with the sealing member 4, was not impaired.

When a photocurable resin composition is used as the plastic lens material, the polymerization is performed by irradiating the material with light such as ultraviolet rays or visible rays using a light irradiation apparatus.

After the polymerization step is taken, the cured plastic lens material 51 is released from the mold and the plastic lens is taken out from the mold. The plastic lens taken out is, for example, a finished lens or semi-finished lens.

Both optical surfaces of the finished lens are completely processed at the time the lens was molded. On the other hand, as to the semi-finished lens, one optical surface is completely processed at the time the lens was molded, and the other surface is processed to have a dioptric power which is required by customers. The semi-finished lens can be employed as a special lens such as a progressive-power lens or a prism prescription lens.

According to the method for producing a plastic lens and the mold 1 in this embodiment, the plastic lens material 51 with which the cavity 24 is filled and which overflows from the through hole 25 can be stored in the interior space 31a of the injection aid member 3. Accordingly, it is not necessary to precisely control the liquid level of the plastic lens material to be injected to the cavity. Moreover, in the injection step of the plastic lens material 51, the leakage of the plastic lens material 51 outside the mold 1 is prevented. This solves problems such as the plastic lens material 51 adheres to instruments or workers involved in the injection step or the polymerization step.

According to the method for producing a plastic lens and the mold 1 in this embodiment, the second opening 34 of the injection aid member 3 is sealed with the sealing member 4. Thus, even if the cross-sectional area of the hole of the nozzle 101 and the through hole 25 are made large, the operation for sealing the injection aid member 3 does not become complicated, and the cavity 24 can easily be hermetically sealed. Hence, the flow rate of the plastic material can be increased to thereby improve the productivity.

According to the method for producing a plastic lens and the mold 1 in this embodiment, the plastic lens material 51 discharged from the nozzle 101 moves on the lens forming surface 22a of the second mold 22, and filled in the cavity 24. This can inhibit a formation of bubbles in the plastic lens material 51 filled in the cavity 24.

According to the mold 1 in this embodiment, the curved surface 32a of the attachment 32 provided on the injection aid member 3 is arranged to have a radius of curvature approximately the same as that of the outer periphery surface of the mold assembly 2. With this arrangement, the curved surface 32a of the attachment 32 can firmly be attached to the outer periphery surface of the mold assembly 2. As a result, the interior space 31a in the injection aid member 3 and the cavity 24 are securely hermetically sealed.

According to the mold 1 in this embodiment, the second opening 34 is larger than the first opening 33. Therefore, the nozzle 101 can be easily inserted into the injection aid member 3. Furthermore, because the first opening 33 is formed into a long and narrow, approximately rectangular shape, even if a plastic lens having a thin outer periphery is formed, the first opening 33 can be caused to face the outer periphery of the cavity. Moreover, because the second opening 34 can be formed larger with respect to the nozzle 101, it is not necessary to control the positions of the nozzle 101 and the mold 1 with very high precision when inserting the nozzle 101. Thus, the nozzle 101 can be easily inserted into the injection aid member 3.

According to the mold 1 in this embodiment, the interior space 31a in the injection aid member 3 becomes narrower as the interior space 31a approaches the first opening 33. In addition, the guide plate 35 forms one side of the first opening 33 and one side of the second opening 34, and has a flat surface which is in parallel with a direction in which both openings 33 and 34 open. On the other hand, the inclined plate 37 forms one side of the first opening 33 and is inclined to a direction in which the first opening 33 and the second opening 34 open.

Thus, even when the guide plate 35 of the injection aid member 3 is placed downwardly, the gas (air) in the interior space 31a does not enter the cavity 24. Moreover, the tip part 101a of the nozzle 101 can easily be inserted into the cavity 24 by inserting the nozzle 101 along the flat surface of the guide plate 35.

In the mold 1 in this embodiment, the radius of curvature of the curved surface 32a of the attachment 32 is set to be approximately the same as the radius of curvature of the outer periphery surface of the mold assembly 2. The attachment used in the present invention, however, may be configured to be elastically deformable in a direction in which the radius of curvature of the curved surface is changed. When the attachment is made in this manner, one mold may be prepared for multiple mold assemblies having a radius of curvature of the outer periphery surface different from each another, thereby fostering the versatility of the mold.

Furthermore, according to the mold 1 in this embodiment, the second opening 34 of the injection aid member 3 is sealed with the sealing member 4. The second opening of the injection aid member in the present invention, however, may be sealed by welding the injection aid member itself using ultrasonic waves, or the like. In such a case, the injection aid member also serves as the sealing member.

When the injection aid member itself is welded using ultrasonic waves to seal the second opening, it is preferable that the second opening is arranged to have two independent tubular holes. Of the two tubular holes, one hole is used for inserting the nozzle, and the other hole is used for exhausting the air in the interior space 31a. This can make the opening area of the second opening smaller, and the welding can easily be performed.

<2. Second Embodiment of Mold>

[Mold]

Next, a mold according to the second embodiment of the present invention will be explained referring to FIGS. 6A-6B.

Figure 6A:
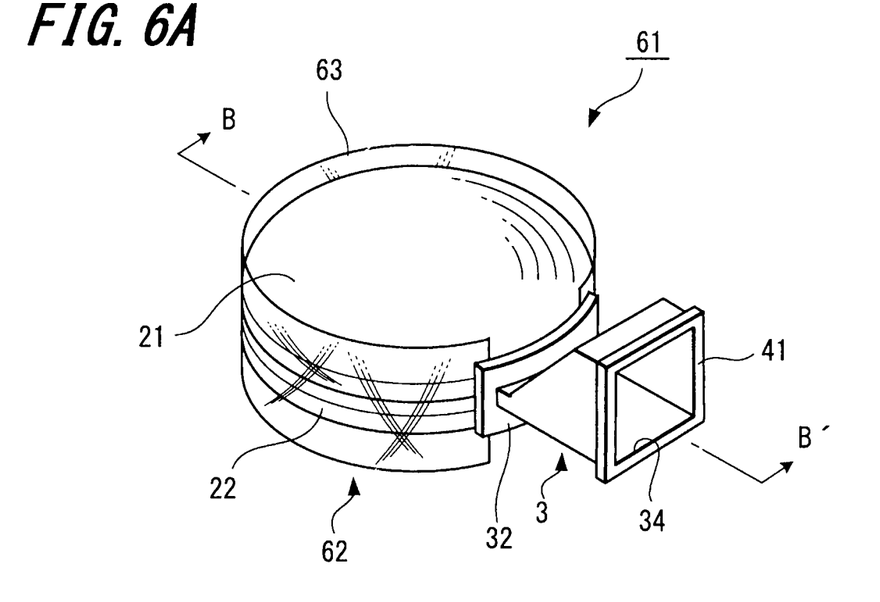
FIG. 6A is a perspective view showing a mold according to a second embodiment of the present invention.
Figure 6B:
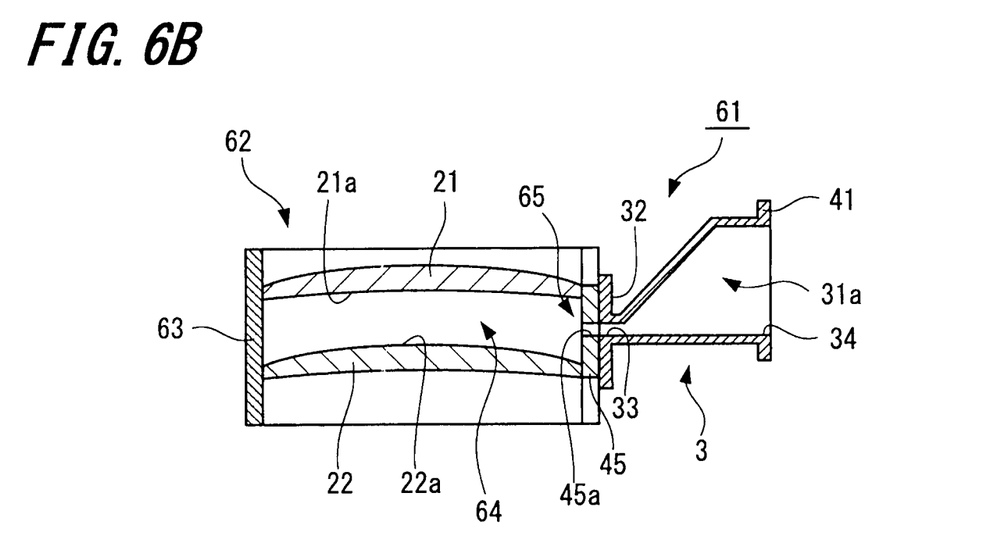
FIG. 6B is a cross-sectional view showing the mold in FIG. 6A by cutting it along with a line indicated by "B-B'".

FIG. 6A is a perspective view showing a mold of the second embodiment, and FIG. 6B is the cross-sectional view showing the mold in FIG. 6A by cutting it along a line indicated by "B-B'".

A mold 61 according to the second embodiment has the same structure as that of the mold 1 of the first embodiment (see FIG. 1), except for a mold assembly 62. Accordingly, with respect to the mold 61, the mold assembly 62 alone will be explained and the same reference numerals are used to designate members identical to those of the mold 1, and a description of the identical members will be omitted.

[Mold Assembly]

The mold assembly 62 includes the first mold 21 and the second mold 22 which are opposed to each other at a certain spaced interval, and a tape member 63 which connects outer peripheries of the two molds 21 and 22. Since the two molds 21 and 22 have the same shape and material as in the mold (see FIG. 1), the description thereof is omitted.

The tape member 63 is an adhesive tape which is the same as the tape member 23, and is wound around the outer peripheries of the first and second molds 21 and 22. The length (in a longitudinal direction) of the tape member 63 is arranged to be shorter than that of the outer peripheries of the first mold 21 and the second mold 22. Thus, in the mold assembly 62, a cavity 64 and an opening for injection 65 which opens the cavity 64 are formed. The opening for injection 65 of the mold assembly 62 is arranged to be smaller than the curved surface 32a of the attachment 32 provided on the injection aid member 3.

The injection aid member 3 is attached to the periphery of the opening for injection 65 formed on the mold assembly 62. Then, the attachment 32 of the injection aid member 3 is fixed to the outer periphery surfaces of the first and second molds 21 and 22 with the adhesive member 45. When the injection aid member 3 is attached to the mold assembly 62, the opening for injection 65 is covered by the attachment 32 of the injection aid member 3. Then, the cavity 64 in the mold assembly 62 and the interior space 31a in the injection aid member 3 are connected to each other through the first opening 33.

[Method for Producing Plastic Lens]

Next, a method for producing a plastic lens using the mold 61 will be explained.

Under a production method according to this embodiment, a mold assembly step, an aid member attachment step, an injection step, a sealing step, and a polymerization step are taken. In other words, under the production method in this embodiment, the through hole forming step taken in the method for producing a plastic lens using the mold 1 is omitted.

In the mold assembly step, the first mold 21 and the second mold 22 are caused to face each other at a certain spaced interval, and the outer peripheries thereof are connected by the tape member 63, whereby the mold assembly 62 having the cavity 64 provided with the opening for injection 65 is assembled.

In the mold assembly step according to the present invention, the opening for injection may be provided after the cavity is hermetically sealed with a tape member longer than the outer periphery of the first mold 21 or second mold 22, and then a cut is made in the tape member. Furthermore, the first mold 21 and the second molds 22 may be connected to each other by using a tape member in which the opening for injection has previously been provided.

In the aid member attachment step, the injection aid member 3 is attached to the mold assembly 62. When the injection aid member 3 is attached to the mold assembly 62, the opening for injection 65 is covered with the attachment 32, and the cavity 64 and the interior space 31a in the injection aid member 3 are connected to each other.

Since the procedures taken in the injection step, the sealing step and the polymerization step are the same as those in the method for producing a plastic lens performed by using the mold 1, the descriptions thereof are omitted.

With the method for producing a plastic lens and the mold 61 according to this embodiment, the same effects as those obtained by employing the method for producing a plastic lens and the mold 1 according to the first embodiment can also be obtained. Moreover, because the through hole forming step can be omitted, the work efficiency can be improved.

Meanwhile, in this embodiment, the opening for injection 65 is formed on the mold assembly 62 by making the length of the tape member 63 shorter than that of the outer periphery of the first mold 21 or second mold 22. However, an opening for injection in the present invention may be previously formed in the tape member. In such a case, the length of the tape member is set to be longer than that of the outer periphery of the first mold 21 or the second mold 22.

<3. Third Embodiment of Mold>

[Mold]

Next, a mold according to a third embodiment of the present invention will be explained referring to FIG. 7.

Figure 7:
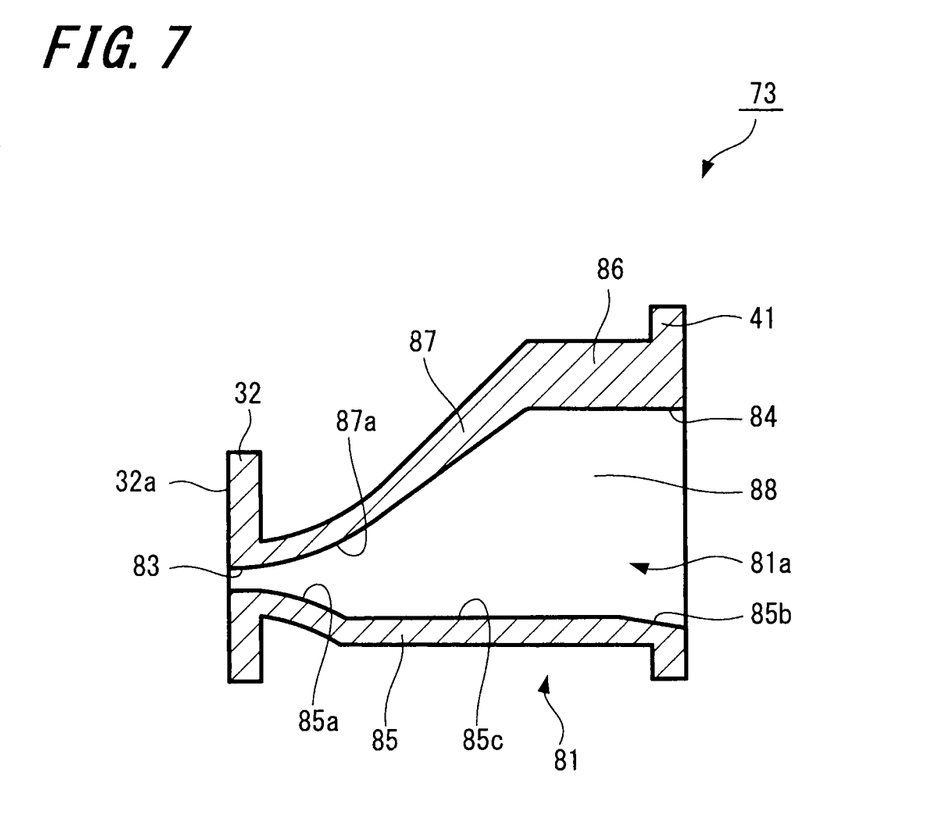
FIG. 7 is a cross-sectional view showing an injection aid member to be used with a mold according to a third embodiment of the present invention.

FIG. 7 is the cross-sectional view showing the injection aid member of the mold according to the third embodiment.

The mold according to the third embodiment has the same structure as that of the mold 1 of the first embodiment (see FIG. 1), except for an injection aid member 73. Thus, with respect to the mold of the third embodiment, the injection aid member 73 alone will be described.

The injection aid member 73 is formed by injection-molding a thermoplastic resin like the injection aid member 3 of the first embodiment, and includes an aid member body 81 which is formed into an approximately quadrangular-tubular shape and the attachment 32 which is continuous with one end of the aid member body 81. The attachment 32 is identical to the attachment 32 of the injection aid member 3 in the first embodiment.

The aid member body 81 includes a first opening 83 which is formed into a long and narrow, approximately rectangular shape, and a second opening 84 which is formed into an approximately quadrangular shape. The opening area of the first opening 83 is set to be smaller than the opening area of the second opening 84. The aid member body 81 has a guide plate 85, a plane plate 86 opposed to the guide plate 85, an inclined plate 87 that is continuous with the plane plate 86, and two side plates 88.

The guide plate 85 forms one side of the first opening 83 and one side of the second opening 84. The inner surface of the guide plate 85 has a taper guide surface 85a on the side of the first opening 83, an inclined surface 85b on the side of the second opening 84, and a flat surface 85c formed between the taper guide surface 85a and the inclined surface 85b.

The taper guide surface 85a is a curved surface which makes an interior space 81a of the aid member body 81 continuously smaller as the taper guide surface 85a approaches a first opening 83, and has an approximately arc-shaped cross-section. The taper guide surface 85a is a guide surface guiding the nozzle 101 (see FIG. 4) to the first opening 83. The inclined surface 85b is inclined to a direction separating from the plane plate 86, and makes the interior space 81a of the aid member body 81 continuously larger as the inclined surface 85b approaches a second opening 84. Furthermore, the flat surface 85c is in parallel with a direction in which both openings 83 and 84 open.

The plane plate 86 forms one side of the second opening 84 and has an inner surface in parallel with the flat surface 85c of the guide plate 85. The inclined plate 87 forms one side of the first opening 83, and is inclined to a direction in which both of the openings 83 and 84 open. With this structure, the interior space 81a in the aid member body 81 becomes narrower as the interior space 81a approaches the first opening 83. The inclined plate 87 has a taper guide surface 87a which makes the interior space 81a in the aid member body 81 continuously smaller as the inclined plate 87 approaches the first opening 83. The taper guide surface 87a serves as a guide surface guiding the nozzle 101 to the first opening 83.

Each of the two side plates 88 is continuous with the guide plate 85, the plane plate 86 and the inclined plate 87, and forms two sides of the first opening 83 and two sides of the second opening 84. Furthermore the fixing portion 41 is provided on the periphery of the second opening 84. The fixing portion 41 is formed into a quadrangular frame shape that is continuous with the guide plate 85, the plane plate 86 and the two side plates 88. The sealing member 4 is firmly attached and fixed to the fixing portion 41 (see FIG. 5).

In the mold of this embodiment, the interior space 81a of the injection aid member 73 has an asymmetrical shape in a direction in which the guide plate 85 and the plane plate 86 are opposed to each other along an axis of the first opening 83, and thus the same effects as those obtained with the mold 1 in the first embodiment can be obtained. Furthermore, since the taper guide surface 85a and the inclined surface 85b are provided on the aid member body 81, even if the nozzle 101 has a shape in which its root portion is wide and a tip portion becomes gradually narrower like a tip portion of a cylinder is crushed in order to secure, for example, the rigidity of the nozzle 101, the nozzle 101 can perpendicularly be inserted. As a result, the detachment of the aid member body 81 from the mold assembly 2, which is caused by a pressure applied to the first opening 83 and the attachment 32 when the nozzle is obliquely inserted into the first opening 83 can be prevented.

The present invention is not limited to the embodiments which have been described and shown in drawings, and various modifications can be made within the scope of the appended claims. For example, in the embodiments described above, the lens forming surface 21a of the first mold 21 is arranged to have a concave surface, and the lens forming surface 22a of the second mold 22 is arranged to have a convex surface. However, the type of the surface of the lens forming surface according to the present invention can suitably be decided depending on the shape of a plastic lens to be formed.

EXPLANATION OF NUMERALS 1, 61 . . . mold, 2, 62 . . . mold assembly, 3, 73 . . . injection aid member, 4 . . . sealing member, 21 . . . first mold, 22 . . . second mold, 23, 63 . . . tape member, 24, 64 . . . cavity, 25 . . . through hole, 31, 81 . . . aid member body, 31a, 81a . . . interior space, 32 . . . attachment, 32a . . . curved surface, 33, 83 . . . first opening, 34, 84 . . . second opening, 35, 85 . . . guide plate, 36, 86 . . . plane plate, 37, 87 . . . inclined plate, 41 . . . fixing portion, 45 . . . adhesive member, 51 . . . plastic lens material, 65 . . . opening for injection, 85a, 87a . . . taper guide surface, 85b . . . inclined surface

The invention claimed is:

1. A method of producing a plastic lens comprising:
a mold assembly step in which a first mold and a second mold are caused to face each other, and outer peripheries of the first mold and the second mold are connected by a tape member to assemble a mold assembly having a cavity;
an aid member attachment step in which an attachment provided around a first opening of an injection aid member having the first opening and a second opening connected to the first opening is firmly attached to the mold assembly, and the first opening is caused to face the tape member forming an outer periphery of the cavity;
a through hole forming step in which a through hole is provided in a portion of the tape member opposed to the first opening;
an injection step in which a nozzle is inserted through the second opening of the injection aid member into the cavity, and a plastic lens material is injected thereto such that the injected plastic lens material overflows from the cavity into an interior space of the injection aid member through the through hole and the through hole is completely filled with the overflowed plastic lens material;
a sealing step in which the second opening of the injection aid member is sealed with a sealing member; and
a polymerization step in which the plastic lens material injected to the cavity is polymerized in a state that the through hole is completely filled with the overflowed plastic lens material.

2. A method of producing a plastic lens comprising:
a mold assembly step in which a first mold and a second mold are caused to face each other, and outer peripheries of the first mold and the second mold are connected by a tape member to assemble a mold assembly having a cavity provided with an opening for injection;
an aid member attachment step in which an attachment provided around a first opening of an injection aid member having the first opening and a second opening connected to the first opening is firmly attached to the mold assembly, and the first opening is caused to face the opening for injection;
an injection step in which a nozzle is inserted through the second opening of the injection aid member into the cavity, and a plastic lens material is injected thereto such that the injected plastic lens material overflows from the cavity into an interior space of the injection aid member through the opening for injection and the opening for injection is completely filled with the overflowed plastic lens material;
a sealing step in which the second opening of the injection aid member is sealed with a sealing member; and
a polymerization step in which the plastic lens material injected to the cavity is polymerized in a state that the opening for injection is completely filled with the overflowed plastic lens material.

* * * * *